Patented Nov. 1, 1932

1,886,087

UNITED STATES PATENT OFFICE

HERBERT W. DAUDT, OF CARNEYS POINT, NEW JERSEY, ASSIGNOR TO E. I. DU PONT DE NEMOURS & COMPANY, OF WILMINGTON, DELAWARE, A CORPORATION OF DELAWARE

PROCESS OF MAKING DI-SUBSTITUTED GUANIDINES

No Drawing.   Application filed May 18, 1928.   Serial No. 278,905.

This invention relates to improvements in the production of disubstituted guanidines, and more particularly diaryl guanidines, such as di-phenyl guanidine, di-tolyl guanidine, etc.

The reaction of cyanogen chloride with ammonia to form guanidine, and with primary amines to form di-substituted guanidines has been well known. For example, in 1848 Hofmann reacted cyanogen chloride with aniline to form di-phenyl guanidine, which he named "melaniline".

J. Traube (Ber. 18, 462 (1885)) used an ether solution of cyanogen chloride into which he passed ammonia for the purpose of preparing guanidine.

According to U. S. Patents 1,639,724 and 1,639,725, to Cronshaw and Naunton, the reaction between the aromatic amine and cyanogen chloride is conducted by adding the amine to an aqueous suspension of the cyanogen chloride. It is recognized that the solubility of cyanogen chloride in water is approximately 8%. The early stages of the reaction are conducted at a low temperature (0 to +5° C.), the latter stages at a higher temperature (80 to 90° C.).

Canadian Patent 277,565 has recently been issued which has apparently slightly modified the procedure of Jennings and Scott (Jour. Am. Chem. Soc. 41, 1245–6 (1919)) for the preparation of solutions of cyanogen chloride in carbon tetrachloride and other chlorinated aliphatic hydrocarbons by substituting small amounts of alcohol for the small amounts of water. The original procedure of Jennings and Scott consisted of passing chlorine into a suspension of sodium cyanide in carbon tetrachloride, the temperature being held at below 0° C. According to the process disclosed by the Canadian patent, aromatic amines, such as aniline, are added to the reaction product in order to prepare the corresponding diaryl guanidines.

It is the object of my invention to produce diaryl guanidines, from alkali cyanide, chlorine and aromatic amines in such a manner that cyanogen chloride, as an intermediate, is present in the form of a solution in an inert solvent. The advantages of such a procedure lie in eliminating the isolation of a volatile, irritating and toxic substance, in the smoothness which the conditions impart to the reaction with the amine, and in the ease of the operations involved. Other objects will appear as the description proceeds.

I have found that cyanogen chloride is soluble in carbon tetrachloride, in aromatic hydrocarbons and also in the chlorinated derivatives of the latter, such, for example, as chlorbenzene. I have taken advantage of these solubilities in the preparation and the use of solutions of cyanogen chloride in these solvents.

Furthermore, I have found that the aromatic hydrocarbons and their chlorinated products are more desirable than carbon tetrachloride because the solubility of cyanogen chloride in each of them is greater than that in carbon tetrachloride. I have also found that the vapor pressure of the solution of cynogen chloride is less when an aromatic solvent is used.

According to my invention, I have been able to use procedures in which toluene and chlorbenzene have been employed expeditiously for the extraction of cyanogen chloride from its aqueous solutions, and, subsequently, these solutions have been used for the preparation of diaryl guanidines upon the addition of the corresponding arylamine.

Another procedure that has developed as a part of my invention consists in chlorinating a suspension of sodium cyanide in toluene or chlorbenzene, and, subsequently, using the solution, with or without the removal of the solid bi-products, for the preparation of diaryl guanidines upon the addition of the corresponding aryl amine.

It is to be noted that the solvents preferred have a boiling temperature above 100° C. For the condensation with the amine, I have found that toluene may be used in place of chlorbenzene as a solvent. However, when the complete procedure, starting from sodium cyanide, as illustrated in Examples 2 and 3 below, is employed, chlorbenzene is preferred because of its greater inertness to the action of chlorine.

I have also found that, contrary to accepted belief, it is unnecessary to conduct the early stages of the amine condensation at a low temperature. For instance, according to my invention diaryl guanidine may be obtained with yields well above 95% of theory by adding a solution of cyanogen chloride in chlorbenzene to toluidine, whose temperature is held at 80° C.

The following are given as illustrative examples of specific embodiments of my invention:

Example 1

Prepare a 5% solution of cyanogen chloride in water by adding sodium cyanide solution to its equivalent amount of chlorine hydrate suspended in water. Agitate 200 parts of this solution with 200 parts of toluene. After discontinuing the agitation, separate the toluene solution from the aqueous solution. The temperature is maintained below 15° C. throughout the operation.

Cool the toluene solution to 5° C., and, while maintaining this temperature, add 15 parts of aniline. Raise the temperature to 100° C. and maintain this temperature for two hours.

Drown the mass in water, make the solution distinctly alkaline. Remove the toluene and the excess aniline by steam distillation. Acidify the residue and warm to 60°. Filter, if necessary to remove solid impurities, and subsequently add the filtrate to an excess of dilute sodium hydroxide solution.

Filter off, wash, and dry the precipitated diphenyl guanidine.

Example 2

Add 225 parts of chlorbenzene to 25 parts of finely ground sodium cyanide. While agitating cool to 0° C., add 0.5 part of water and 31 parts of chlorine. When the chlorine has been consumed, add 105 parts of ortho-toluidine, maintaining a temperature below 10° C. Raise the temperature to 110° C. and maintain this temperature for 2½ hours.

The drowning of the solution in water, and all subsequent steps may be carried out according to the directions given in Example 1 for diphenyl guanidine.

Example 3

Prepare a solution of cyanogen chloride in chlorbenzene according to the directions given in Example 2. Remove the solid impurities by a low temperature filtration. Analyze the filtrate for its cyanogen chloride content. By dilution adjust the solution so that the cyanogen chloride content is exactly 10%.

Weigh out 60 parts of ortho-toluidine and while agitating heat to 80° C. Now, while maintaining this temperature, add 170 parts of 10% cyanogen chloride solution. Raise the temperature to 100° and maintain the latter temperature for two hours.

Drown the reaction mass in water and isolate the di-ortho-tolyl guanidine according to the directions given in Example 1 for diphenyl guanidine.

The amount of amine used may be the theoretical quantity required or it may be used in excess.

The sodium cyanide used may be replaced by other alkali cyanides.

As many apparently widely different embodiments of this invention may be made without departing from the spirit thereof, it is to be understood that I do not intend to limit myself to the specific embodiments thereof except as indicated in the appended claims.

I claim:

1. In the process of making a diaryl guanidine, the step which comprises taking a solution of cyanogen halide in a compound of the benzene series which is a solvent for and substantially inert toward the reacting substances, and treating it with a primary aromatic amine to form the diaryl guanidine.

2. In the process of making a di-ortho-tolyl guanidine, the step which comprises taking a solution of cyanogen halide in a compound of the benzene series which is a solvent for and substantially inert toward the reacting substances, and treating it with ortho-toluidine to form the di-ortho-tolyl guanidine.

3. In the process of making a diaryl guanidine, the step which comprises taking a solution of cyanogen chloride in a chlorinated compound of the benzene series which is a solvent for and substantially inert toward the reacting substances, and treating it with a primary aromatic amine to form the diaryl guanidine.

4. In the process of making a diaryl guanidine, the step which comprises taking a solution of cyanogen halide in chlorbenzene, and treating it with a primary aromatic amine to form the diaryl guanidine.

5. In the process of making a diaryl guanidine, the step which comprises taking a solution of cyanogen chloride in chlorbenzene and treating it with a primary aromatic amine to form the diaryl guanidine.

6. The process which comprises reacting a cyanide with chlorine, in the presence of a compound of the benzene series which is a solvent for and substantially inert toward the reacting substances, and treating the solution thus formed with an organic amine.

7. The process which comprises reacting sodium cyanide with chlorine, in the presence of a compound of the benzene series which is a solvent for and substantially inert toward the reacting substances, and treating the solution thus formed with a primary aromatic amine.

8. In the production of a di-substituted guanidine, the process which comprises treating an alkali metal cyanide with chlorine in the presence of a compound of the benzene series which is a solvent for and substantially inert toward the reacting substances and in the absence of an organic catalyst, treating the cyanogen chloride solution thus obtained with a primary aromatic amine and subsequently heating the mixture, with the production of the di-substituted guanidine in the form of its hydrochloride.

9. In the process of making a diaryl guanidine, the step which comprises taking a solution of cyanogen halide in a compound of the benzene series which is a solvent for and substantially inert toward the reacting substances and treating it with a primary aromatic amine to form the diaryl guanidine, the cyanogen halide solution and the aromatic amine being brought into contact at a temperature sufficiently high to complete the reaction for the formation of the diaryl guanidine.

10. In the process of making a diaryl guanidine, the step which comprises taking a solution of cyanogen chloride in a chlorinated compound of the benzene series which is a solvent for and substantially inert toward the reacting substances and treating it with a primary aromatic amine to form the diaryl guanidine, the cyanogen chloride solution being brought in contact with the aromatic amine at a temperature sufficiently high to complete the reaction to the diaryl guanidine.

11. In the process of making di-orthotolyl guanidine, the step which comprises reacting an alkali metal cyanide with chlorine in chlorobenzene and treating the solution thus formed with ortho-toluidine to form di-ortho-tolyl-guanidine.

12. In the process of making a diaryl guanidine, the steps of preparing a solution of a cyanogen halide in a compound of the benzene series which is a solvent for and substantially inert toward the reacting substances in the absence of a gaseous cyanogen halide and treating the cyanogen halide solution with a primary aromatic amine to form a diaryl guanidine.

In testimony whereof, I affix my signature.

HERBERT W. DAUDT.